United States Patent
Cudak et al.

(10) Patent No.: US 9,740,440 B2
(45) Date of Patent: Aug. 22, 2017

(54) SEPARATING A HYBRID ASYMMETRIC MIX OF A RAID 1 MIRROR AND A PARITY-BASED RAID ARRAY

(71) Applicant: Lenovo Enterprise Solutions (Singapore) Pte. Ltd., Singapore (SG)

(72) Inventors: Gary D. Cudak, Wake Forest, NC (US); Christopher J. Hardee, Raleigh, NC (US); Lydia M. Do, Morrisville, NC (US); Adam Roberts, Moncure, NC (US)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 74 days.

(21) Appl. No.: 14/718,520

(22) Filed: May 21, 2015

(65) Prior Publication Data

US 2016/0342470 A1    Nov. 24, 2016

(51) Int. Cl.
| | |
|---|---|
| *G11B 20/18* | (2006.01) |
| *H02H 3/05* | (2006.01) |
| *G06F 3/06* | (2006.01) |
| *G06F 11/10* | (2006.01) |

(52) U.S. Cl.
CPC .......... *G06F 3/0689* (2013.01); *G06F 3/064* (2013.01); *G06F 3/065* (2013.01); *G06F 3/0619* (2013.01); *G06F 11/1096* (2013.01); *G06F 2211/103* (2013.01)

(58) Field of Classification Search
CPC .......... G06F 11/1076; G06F 2211/104; G06F 11/1092; G06F 2211/1028; G06F 11/2056; G06F 3/0689; G06F 2211/1054; G06F 11/1088; G11B 2220/415
See application file for complete search history.

(56) References Cited

U.S. PATENT DOCUMENTS

| | | | | |
|---|---|---|---|---|
| 6,480,969 | B1* | 11/2002 | Hitz | G06F 11/1076 714/6.22 |
| 7,191,285 | B2* | 3/2007 | Scales | G06F 3/0611 711/114 |
| 8,074,149 | B2* | 12/2011 | Stolowitz | G06F 3/0617 714/770 |
| 2005/0223269 | A1* | 10/2005 | Stolowitz | G06F 3/0617 714/6.12 |

(Continued)

*Primary Examiner* — Phung M Chung
(74) *Attorney, Agent, or Firm* — Jeffrey L. Streets

(57) ABSTRACT

A RAID controller stores data in a hybrid asymmetric mix of a RAID 1 mirror and a parity-based RAID array, wherein a first side of the RAID 1 mirror includes a single data storage device storing an operating system image and a second side of the RAID 1 mirror includes a plurality of data storage devices forming a parity-based RAID array. The RAID controller normally calculates parity using data from both the single data storage device and the plurality of data storage devices. However, in response to a user command, the RAID controller recalculates parity stripes on each of the plurality of data storage devices using a predetermined data pattern for a logical data storage device logically replacing the single data storage device storing the operating system. Accordingly, the same stripe count is maintained and the parity-based RAID array maintains redundancy despite physical separation of the single data storage device.

19 Claims, 6 Drawing Sheets

(56) References Cited

U.S. PATENT DOCUMENTS

| | | | |
|---|---|---|---|
| 2007/0113008 A1* | 5/2007 | Scales | G06F 3/0611 |
| | | | 711/114 |
| 2012/0221922 A1* | 8/2012 | Bennett | G06F 11/1068 |
| | | | 714/758 |
| 2015/0012701 A1* | 1/2015 | Cudak | G06F 3/0619 |
| | | | 711/114 |

* cited by examiner

SEPARATING A HYBRID ASYMMETRIC MIX OF A RAID 1 MIRROR AND A PARITY-BASED RAID ARRAY

BACKGROUND

Field of the Invention

The present invention relates to the management of data storage, specifically including the use of a redundant array of independent disks.

Background of the Related Art

In modern computer systems, the need for data reliability and input/output performance has led to the development of a series of data storage schemes that divide and replicate data among multiple data storage devices. Such a storage scheme is commonly referred to as a Redundant Array of Independent Disks (RAID). A RAID system combines physical data storage devices, such as hard disk drives, into a single logical unit by using either special hardware or software. A hardware solution will typically be designed to present itself to the attached system as a single logical device or drive, such that the operating system is unaware of the technical workings of the underlying array. Alternatively, a software solution may be implemented in an operating system, and would similarly present the RAID drive to applications as a single device or drive. The minimum number of drives and the level of data reliability depend on the type of RAID scheme that is implemented.

Originally there were five RAID levels, where different RAID levels use one or more techniques referred to as mirroring, striping and error correction. Mirroring involves the copying of data to more than one disk, striping involves the spreading of data across more than one disk, and error correction involves storing redundant data (parity) to allow problems to be detected and possibly fixed.

A RAID 0 array spreads data evenly across two or more disks with no parity. Accordingly, it can be said that RAID 0 provides striping without any redundancy. RAID 0 is appropriate for high performance where there is little or no concern over data integrity.

A RAID 1 array provides a complete and exact copy of data on two or more disks. Accordingly, RAID 1 includes complete redundancy or mirroring. The performance of RAID 1 is good, and may optionally include duplexing that enables independent reading of different sectors of the disks to increase speed further. The data integrity of RAID 1 is also good, due to the complete copy maintained in the companion disk.

In general, RAID 3 provides byte-level striping with a dedicated parity disk, RAID 4 provides block-level striping with a dedicated parity disk, and RAID 5 provides block-level striping with parity data distributed across all member disks. RAID 5 has achieved popularity due to its low cost of redundancy. Generally, RAID 5 is implemented with hardware support for parity calculations. A minimum of three disks is generally required for a complete RAID 5 configuration. RAID 5 offers a balance between price and performance for most commercial server workloads, and provides single-drive fault tolerance by implementing a technique called single equation single unknown. The checksum information is evenly distributed over all drives, and checksum update operations are evenly balanced within the array.

During read operations, parity blocks are typically not read since this would be unnecessary overhead and would diminish performance. The parity blocks are read, however, when a read of a data sector results in a CRC error (each sector is protected by a CRC as well). In this case, the sector in the same relative position within each of the remaining data blocks in the stripe and within the parity block in the stripe are used to reconstruct the errant sector. The CRC error is thus hidden from the main computer. Likewise, should a disk fail in the array, the parity blocks from the surviving disks are combined mathematically with the data blocks from the surviving disks to reconstruct the data on the failed drive "on the fly". However, in RAID 5, where there is a single parity block per stripe, the failure of a second drive results in total data loss. The foregoing discussion of RAID levels is intended to provide general examples of features included in different RAID levels, and is not intended be a comprehensive list or description of RAID levels.

BRIEF SUMMARY

One embodiment of the present invention provides a method, comprising a RAID controller storing data in a hybrid asymmetric mix of a RAID 1 mirror and a parity-based RAID array, wherein a first side of the RAID 1 mirror includes a single data storage device storing an operating system image and a second side of the RAID 1 mirror includes a plurality of data storage devices forming a parity-based RAID array, and wherein the RAID controller calculates parity using data from both the single data storage device and the plurality of data storage devices. The method further comprises, in response to a user command, the RAID controller recalculating parity stripes on each of the plurality of data storage devices using a predetermined data pattern for a logical data storage device logically replacing the single data storage device storing the operating system, wherein the same stripe count is maintained before and after the logical data storage device logically replaces the single data storage device storing the operating system image.

Another embodiment of the present invention provides a computer program product for controlling data storage, the computer program product comprising a computer readable storage medium having program instructions embodied therewith, wherein the program instructions are executable by a processor to cause the processor to perform a method. The method comprises a RAID controller storing data in a hybrid asymmetric mix of a RAID 1 mirror and a parity-based RAID array, wherein a first side of the RAID 1 mirror includes a single data storage device storing an operating system image and a second side of the RAID 1 mirror includes a plurality of data storage devices forming a parity-based RAID array, and wherein the RAID controller calculates parity using data from both the single data storage device and the plurality of data storage devices. The method further comprises, in response to a user command, the RAID controller recalculating parity stripes on each of the plurality of data storage devices using a predetermined data pattern for a logical data storage device logically replacing the single data storage device storing the operating system, wherein the same stripe count is maintained before and after the logical data storage device logically replaces the single data storage device storing the operating system image.

DETAILED DESCRIPTION

Figures 1A, 1B:
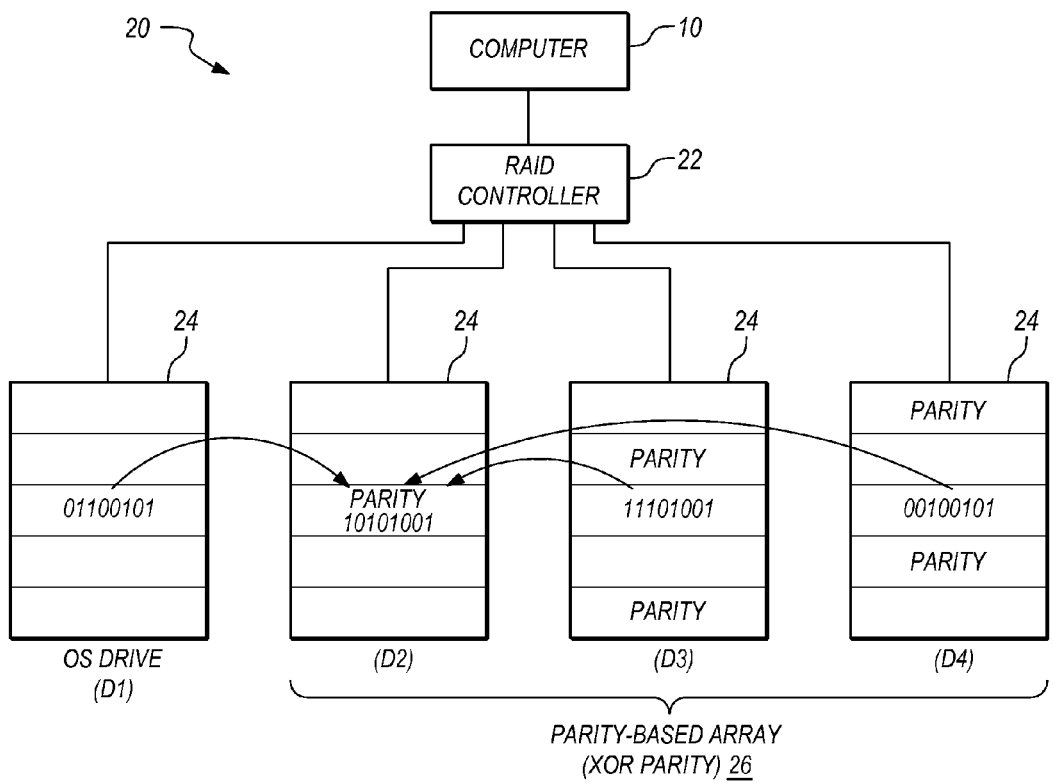
FIG. 1A is a diagram of a hybrid asymmetric mix of a RAID 1 mirror and a parity-based RAID array illustrating a parity calculation.
FIG. 1B is a table showing an XOR parity calculation for the array of FIG. 1A.

One embodiment of the present invention provides a method, comprising a RAID controller storing data in a hybrid asymmetric mix of a RAID 1 mirror and a parity-based RAID array, wherein a first side of the RAID 1 mirror includes a single data storage device storing an operating system image and a second side of the RAID 1 mirror includes a plurality of data storage devices forming a parity-based RAID array, and wherein the RAID controller calculates parity using data from both the single data storage device and the plurality of data storage devices. The method further comprises, in response to a user command, the RAID controller recalculating parity stripes on each of the plurality of data storage devices using a predetermined data pattern for a logical data storage device logically replacing the single data storage device storing the operating system, wherein the same stripe count is maintained before and after the logical data storage device logically replaces the single data storage device storing the operating system image.

The hybrid asymmetric mix of a RAID 1 mirror and a parity-based RAID array is "asymmetric" because the parity-based RAID array utilizes data from the RAID 1 mirror for its parity calculations. The hybrid asymmetric mix of a RAID 1 mirror and a parity-based RAID array may be referred to as a direct attached storage subsystem. In the event that the RAID 1 mirror data storage device is removed, fails or there is a read-error, the RAID controller can regenerate data on the removed or failed device or on the stripe that can't be read by utilizing the content in the parity-based RAID array. The RAID 1 mirror contains none of the data from the parity-based data array, so that the RAID 1 mirror storing the operating system may be separated from the parity-based RAID array. The parity-based RAID array may be any parity-based RAID level, such as a RAID level 5 (block level striping and distributed parity) or RAID level 6 (block level striping and two distributed parity blocks). The parity-based RAID array may operate as a stand-alone data array, except that where a data storage device of the parity-based RAID array has a read error or failure it is necessary to read the relevant stripe, portion or entirety of the RAID 1 mirror storing the operating system during a regeneration of the relevant stripe, portion or entire drive of the data storage device.

The operating system for a host compute node may be stored in the RAID 1 mirror so that the operating system is stored separately from the data stored in the parity-based RAID array. Accordingly, operating system "images" may be loaded on any compute node that is being configured without the risk of old or private data being inappropriately propagated. Embodiments of the present invention allow the operating system to be mirrored without using two drive slots, and enables redundancy to the operating system without permanently wrapping the operating system into the data disks.

During normal operation of the hybrid asymmetric mix of a RAID 1 mirror and a parity-based RAID array, the RAID controller calculates parity using data from both the single data storage device (RAID 1 mirror) and the plurality of data storage devices (parity-based RAID array). Parity may be calculated in any known manner, such as performing an exclusive-OR (XOR) on the data from both the single data storage device and the plurality of data storage devices. Should any of the data storage device fail, the contents of the failed data storage device can be reconstructed or regenerated on a replacement data storage device by subjecting the data from the remaining data storage device to the same XOR operation.

In response to a user command, the RAID controller recalculates parity stripes on each of the plurality of data storage devices using a predetermined data pattern for a logical data storage device (i.e., physically non-existent device) logically replacing the single data storage device storing the operating system. While any predetermined data pattern may be used, a convenient and storage-efficient data pattern is selected from all logical ones and all logical zeros. The use of a logical data storage device serves to maintain the same stripe count (number of data blocks/stripes included in the parity calculation) before and after the separation of the single data storage from the plurality of data storage devices.

The user command may be referred to as an "unzip" command, since the recalculation of parity prepares the parity-based RAID array to stand on its own and maintain redundancy after the single data storage device has been removed. In a first example, the parity may be recalculated by performing an exclusive-OR (XOR) on the data from the plurality of data storage devices (excluding the data storage device that will store the parity stripe) and the logical data storage device, but the data on the single data storage device is not included in the recalculation of parity that occurs in response to the user command. In a second example, the parity may be recalculated by performing an exclusive-OR (XOR) on the data from the single data storage device, the logical data storage device and the current parity data (i.e., pre-unzip parity that included the single data storage device). This second example provides a potential benefit of less overhead where the parity-based RAID array includes a large number of data storage device, but the single data storage device must remain attached until the parity recalculation has completed.

As the RAID controller is recalculating parity stripes, the RAID controller will preferably keep track of the identity of the parity stripes that have been recalculated. Accordingly, if the RAID controller is servicing read operations directed to the parity-based RAID array and detects a read-error, the RAID controller can determine how to regenerate the necessary data. If the parity stripe is identified as not yet being recalculated in response to an unzip command, then the RAID controller will regenerate data using both the plurality of data storage devices and the single data storage device. If the parity stripe is identified as having already been recalculated in response to the unzip command, then the RAID controller will regenerate data using only the plurality of data storage devices. It is also possible to regenerate a stripe on the single data storage device until the parity for the relevant stripe has been recalculated.

While the single data storage device may be removed prior to recalculating parity stripes on the parity-based RAID array, doing so will put the parity-based RAID array in critical mode (i.e., there is a loss of redundancy). Accordingly, if any one of the plurality of data storage devices fails, the data on the entire parity-based RAID array is lost. Therefore, it is preferable to wait until all of the parity for the parity-based RAID array has been recalculated before physically disconnecting the single data storage device from the RAID controller such that the parity-based RAID array never experiences a loss of redundancy. Optionally, the parity stripes are recalculated while the operating system is still running.

Optionally, the single data storage device storing the operating system image may be physically replaced with a second data storage device storing an updated operating system image. The second data storage device is completely bootable immediately upon connection with the RAID controller. And while the parity-based RAID array has redundancy, the newly-installed second data storage device will be in critical mode until the parity in again recalculated based on the second data storage device storing the updated operating system and the data stripes of the parity-based RAID array. The RAID controller may keep track of which parity stripes have been rebuilt in consideration of the new operating system device so that, in the event of a read error, the RAID controller will know whether to regenerate the data using only the devices of the data array or using the devices of the data array as well as the operating system data storage device. Accordingly, the operating system data storage device may be "unzipped" from the data storage system and a different operating system data storage device may be "zipped" into the data storage system without any loss of redundancy to the parity-based RAID array (i.e., without entering a critical mode).

Another embodiment of the present invention provides a computer program product for controlling data storage, the computer program product comprising a computer readable storage medium having program instructions embodied therewith, wherein the program instructions are executable by a processor to cause the processor to perform a method. The method comprises a RAID controller storing data in a hybrid asymmetric mix of a RAID 1 mirror and a parity-based RAID array, wherein a first side of the RAID 1 mirror includes a single data storage device storing an operating system image and a second side of the RAID 1 mirror includes a plurality of data storage devices forming a parity-based RAID array, and wherein the RAID controller calculates parity using data from both the single data storage device and the plurality of data storage devices. The method further comprises, in response to a user command, the RAID controller recalculating parity stripes on each of the plurality of data storage devices using a predetermined data pattern for a logical data storage device logically replacing the single data storage device storing the operating system, wherein the same stripe count is maintained before and after the logical data storage device logically replaces the single data storage device storing the operating system image.

The foregoing computer program product may further include computer readable program code for implementing or initiating any one or more aspects of the methods described herein. Accordingly, a separate description of the foregoing methods will not be duplicated in the context of a computer program product.

FIG. 1A is a diagram of a computer 10 connected to a data storage system 20 that may be described as a hybrid asymmetric mix of a RAID 1 mirror and a parity-based RAID array. The data storage system 20 includes a RAID controller 22 connected to four data storages devices 24 individually identified as D1, D2, D3 and D4. In this example, the data storage device D1 stores an operating system for the computer 10, and may therefore be referred to as the "operating system drive," "operating system data storage device" or variants thereof. The parity-based RAID array 26 includes the plurality of data storage devices D2, D3 and D4. As shown, a first side of the RAID 1 mirror includes a single data storage device D1 storing an operating system image and a second side of the RAID 1 mirror includes the plurality of data storage devices D2, D3 and D4 forming the parity-based RAID array 26. Specifically, the parity-based RAID array 26 is a RAID level 5 (or simply "RAID 5") array implementing distributed parity. Note that each data storage device D1, D2, D3 and D4 is illustrate as being divided into rows of blocks or mirror stripes collectively forming a major stripe that extends across the data storage devices. Although data is only illustrated in the third major stripe, data may or may not be present in the other major stripes. Note that the "parity" stripes are labeled in order to illustrate that the parity blocks are "distributed" across the data storage devices of the parity-based RAID array 26.

The RAID controller is illustrated as performing a parity calculation for the third major stripe. In normal operation of the data storage system 20, the RAID controller calculates parity using data from both the single data storage device D1 and the plurality of data storage devices in the parity-based RAID array 26. The one data storage device in the parity-based RAID array 26 that is to store parity is excluded from the calculation and stores the result of the calculation. In this example, the third major stripe stores parity in the data storage device D2 based on the data (within the same major stripe) from the other data storage devices D1, D3 and D4.

FIG. 1B is a table showing an XOR parity calculation for the array of FIG. 1A. The eight bits is shown as a representation of the data stored in a given block or minor stripe. The table vertically aligns the bit positions of data blocks for the purpose of illustration. An XOR parity calculation is performed on each column of data (i.e., first bit of data from D1, first bit of data from D2, and first bit of data from D3) and the result is shown in the bottom row (i.e., below the double line). Essentially, the XOR function determines whether there is an odd number of 1's in a group of bits. Accordingly, the XOR parity has been calculated and is shown as being stored in relevant parity stripe of D2 in FIG. 1A.

Figures 2A, 2B:
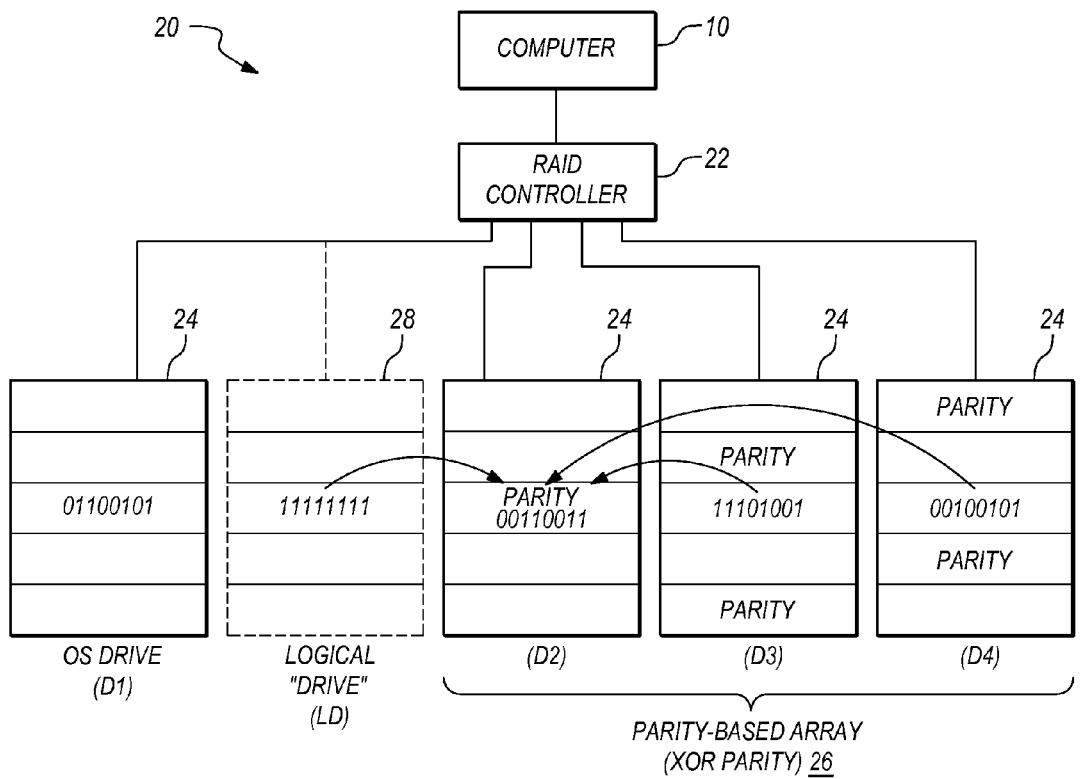
FIG. 2A is a diagram of the hybrid asymmetric mix of a RAID 1 mirror and a parity-based RAID array illustrating a first method of recalculating parity involving a logical drive.
FIG. 2B is a table showing recalculation of XOR parity according to the first method.

FIG. 2A is a diagram of the data storage system 20 illustrating a first method of recalculating parity involving a logical drive or logical data storage device (LD) 28. The logical drive 28 is illustrated in dashed lines to highlight the fact that this is not a physical drive, but a predetermined pattern, such as all 1's, that the RAID controller uses as part of the parity calculation rather than the data storage device D1. More particularly, the RAID controller 22, in response to a user command (i.e., an unzip command), recalculates parity stripes on each of the plurality of data storage devices using a predetermined data pattern for a logical data storage device LD logically replacing the single data storage device D1 storing the operating system. As shown by the arrows, the parity calculation uses data from the logical drive LD and two data storages devices D3 and D4. Accordingly, the same stripe count is maintained before and after the logical data storage device logically replaces the single data storage device storing the operating system image. This means that the XOR parity calculation still has three sources of data. FIG. 2B is a table showing recalculation of XOR parity according to the first method.

Figures 3A, 3B:
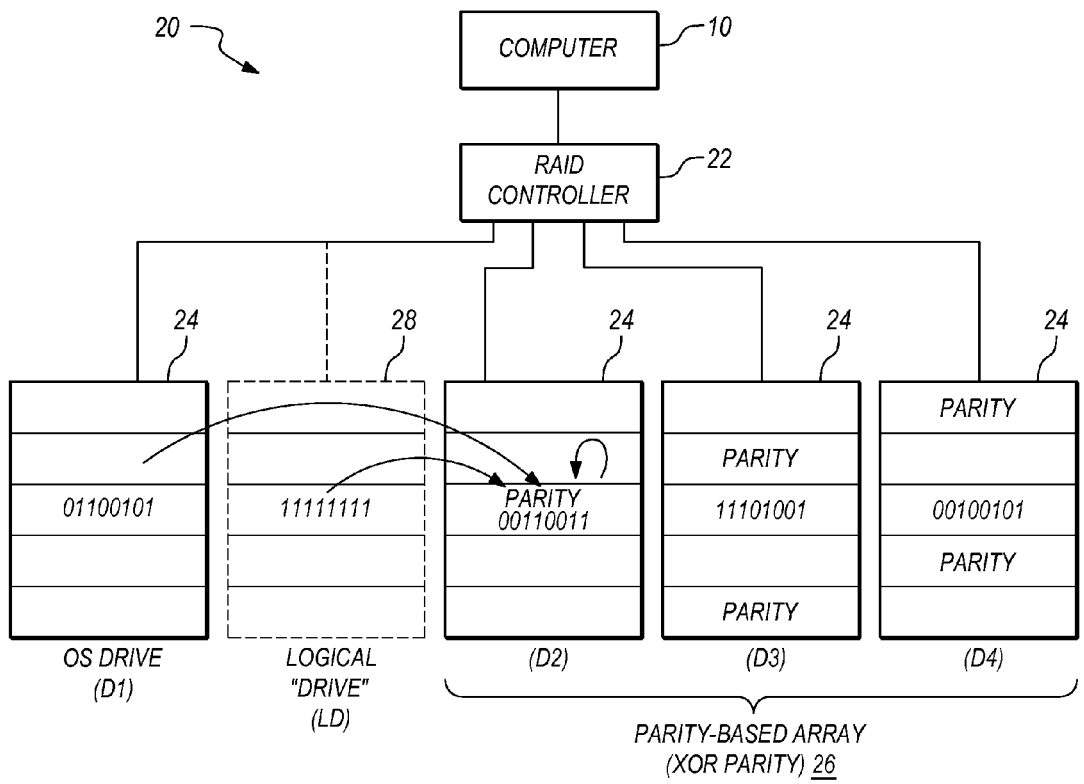
FIG. 3A is a diagram of the hybrid asymmetric mix of a RAID 1 mirror and a parity-based RAID array illustrating a second method of recalculating parity involving a logical drive.
FIG. 3B is a table showing recalculation of XOR parity according to the second method.

FIG. 3A is a diagram of the data storage system 20 illustrating a second method of recalculating parity involving the logical drive 28. As shown, each parity stripe is recalculated by taking the exclusive-OR of the logical data storage device LD, the current parity stripe on D2, and the single data storage device D1 storing the operating system image. In this method it is not necessary to read data storage devices D3 or D4, or include them in the parity calculation. FIG. 3A shows the recalculated (new) parity data.

FIG. 3B is a table showing recalculation of XOR parity according to the second method. As described above, the parity stripe is recalculated by taking the exclusive-OR of the logical data storage device LD, the current (old) parity stripe on D2, and the single data storage device D1 storing the operating system image. The resulting (new) parity stripe is shown below the double line. Note that the result of parity calculation according to the second method (FIGS. 3A and 3B) is the same as the result of the parity calculation according to the first method (FIGS. 2A and 2B).

Figure 4:
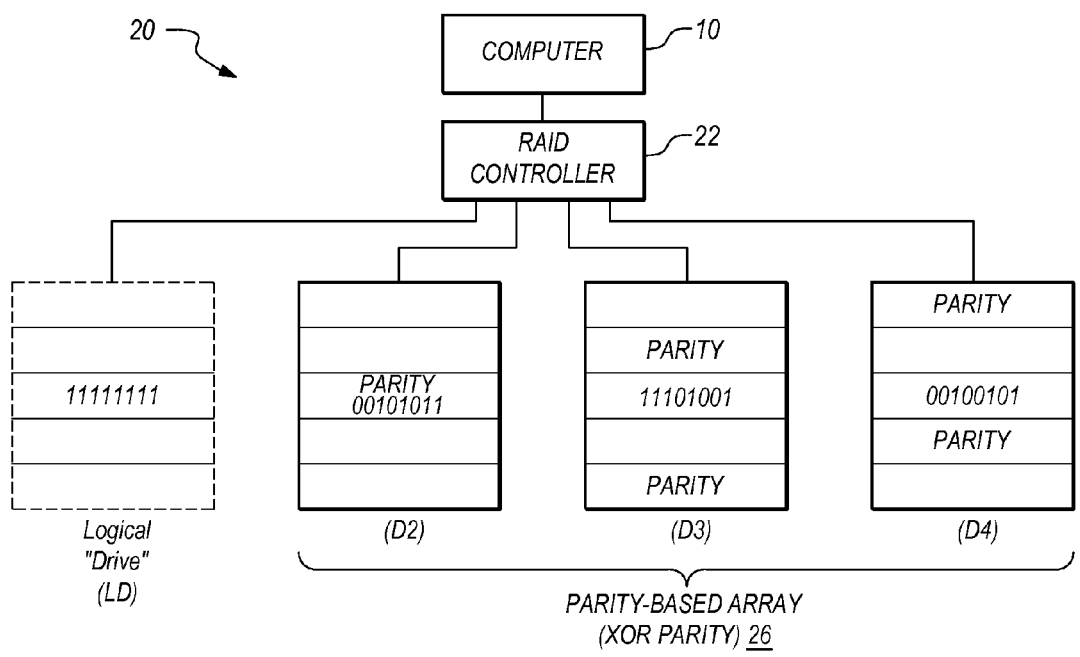
FIG. 4 is a diagram of the hybrid asymmetric mix of a RAID 1 mirror and a parity-based RAID array after the operating system drive (D1) has been separated from the parity-based RAID array.

FIG. 4 is a diagram of the data storage system 20 after the operating system drive (D1) has been physically separated from the parity-based RAID array 26. Even without the operating system drive D1, the recalculated parity enables the parity-based RAID array to maintain redundancy.

Figures 5A, 5B:
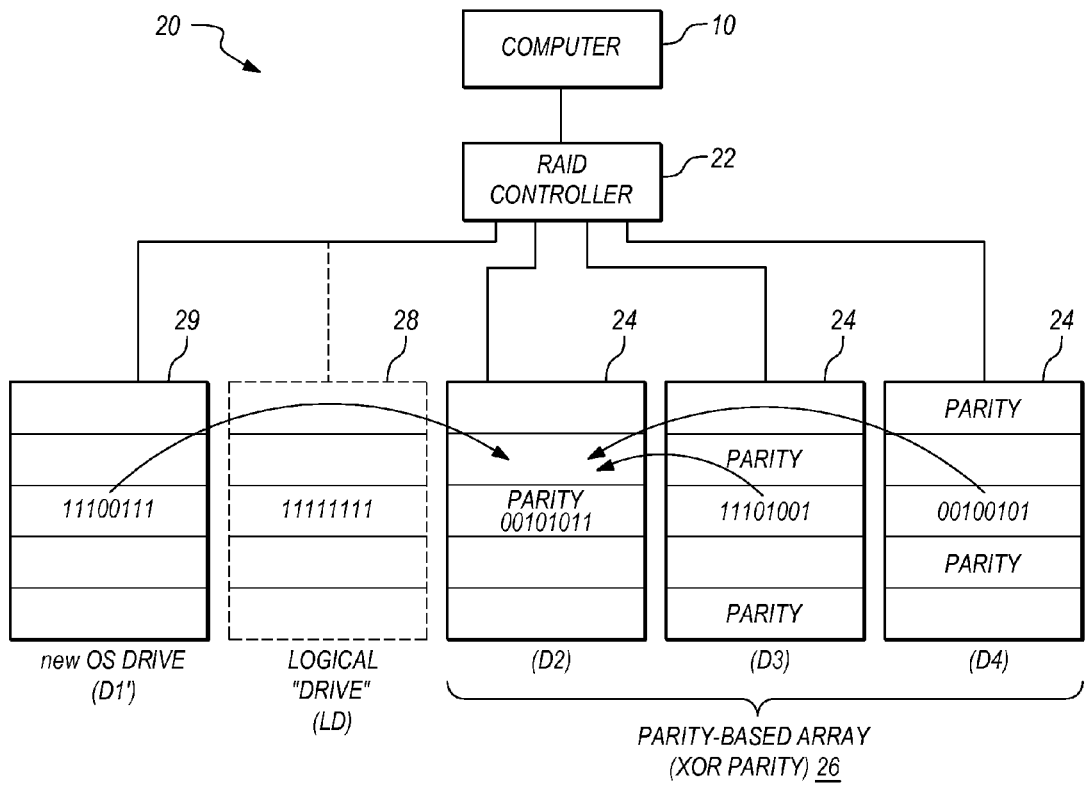
FIG. 5A is a diagram of the hybrid asymmetric mix of a RAID 1 mirror and a parity-based RAID array illustrating the regeneration of parity after a second operating system drive (D1') has been installed.
FIG. 5B is a table showing a further recalculation of XOR parity with the second operating system drive installed.

FIG. 5A is a diagram of the data storage system 20 illustrating the recalculation of parity after a second operating system drive (D1') has been installed. With the new operating system drive D1' installed, the logical drive LD is no longer used. The recalculation of parity in this instance may be initiated in response to detecting presence of the new drive D1' or in response to a user command (i.e., a zip command) indicating that the physical device D1' should be meshed with the parity-based RAID array 26. The RAID controller may recalculate each parity stripe by taking the exclusive-OR of the new operating system drive D1', the data storage device D3, and the data storage device D4. FIG. 5B is a table showing a recalculation of XOR parity with the second operating system drive installed in accordance with a zip operation.

Figure 6:
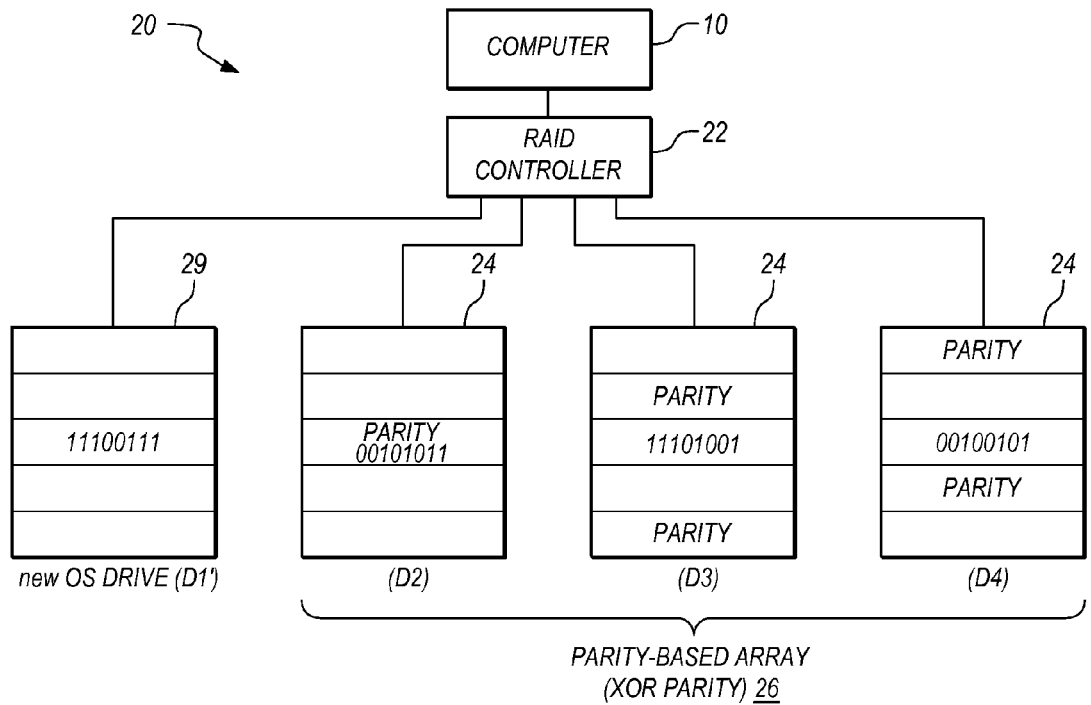
FIG. 6 is a diagram of the hybrid asymmetric mix of a RAID 1 mirror and a parity-based RAID array in normal operation with the second operating system drive.

FIG. 6 is a diagram of the data storage system 20 in normal operation with the second operating system drive 29 and the three data storage devices D2, D3 and D4 of the parity-based RAID array 26. Once the parity has been fully recalculated as described in reference to FIGS. 5A and 5B, the logical drive is ignored until any subsequent unzip command is received. Furthermore, the second operating system drive 29 now has redundancy as well as does the parity-based RAID array 26.

Figure 7:
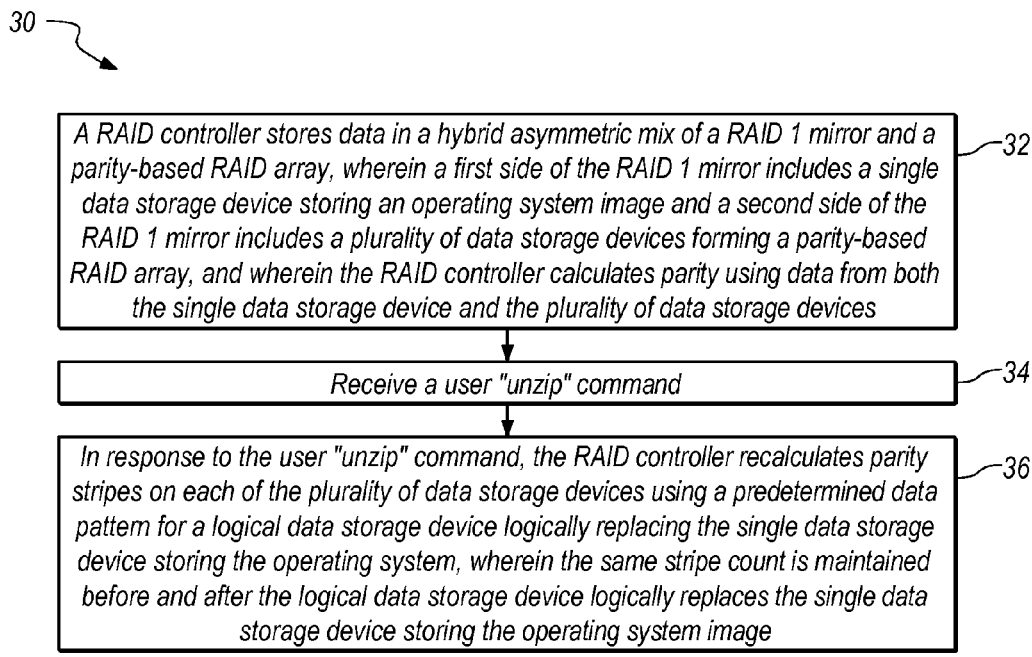
FIG. 7 is a flowchart of a method in accordance with one embodiment of the present invention.

FIG. 7 is a flowchart of a method 30 in accordance with one embodiment of the present invention. In step 32, a RAID controller stores data in a hybrid asymmetric mix of a RAID 1 mirror and a parity-based RAID array, wherein a first side of the RAID 1 mirror includes a single data storage device storing an operating system image and a second side of the RAID 1 mirror includes a plurality of data storage devices forming a parity-based RAID array, and wherein the RAID controller calculates parity using data from both the single data storage device and the plurality of data storage devices. In step 34, the RAID controller receives a user "unzip" command. In step 36, the RAID controller, in response to the user "unzip" command, recalculates parity stripes on each of the plurality of data storage devices using a predetermined data pattern for a logical data storage device logically replacing the single data storage device storing the operating system, wherein the same stripe count is maintained before and after the logical data storage device logically replaces the single data storage device storing the operating system image.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention may be described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, and/or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the invention.

The corresponding structures, materials, acts, and equivalents of all means or steps plus function elements in the claims below are intended to include any structure, material, or act for performing the function in combination with other claimed elements as specifically claimed. The description of the present invention has been presented for purposes of illustration and description, but it is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method, comprising:
storing, by a RAID controller, data in a hybrid asymmetric mix of a RAID 1 minor and a parity-based RAID array, wherein a first side of the RAID 1 mirror includes a single data storage device operatively coupled to the RAID controller and storing an operating system image, and wherein a second side of the RAID 1 mirror includes a plurality of data storage devices operatively coupled to the RAID controller and forming the parity-based RAID array;
calculating, by the RAID controller, parity using data from both the single data storage device and the plurality of data storage devices;
storing, by the RAID controller, the parity only on the plurality of data storage devices;
recalculating, by the RAID controller in response to a user command, parity on each of the plurality of data storage devices using a predetermined data pattern for a logical data storage device logically replacing the single data storage device storing the operating system image, wherein the same stripe count is maintained before and after the logical data storage device logically replaces the single data storage device storing the operating system image;
storing, by the RAID controller, the recalculated parity on the plurality of data storage devices; and
after storing the recalculated parity on each of the plurality of data storage devices, physically disconnecting the single data storage device from the RAID controller without the parity-based RAID array having a loss of redundancy.

2. The method of claim 1, wherein the predetermined data pattern is selected from all logical ones and all logical zeros.

3. The method of claim 1, wherein the parity is distributed across the plurality of data storage devices that form the parity-based RAID array.

4. The method of claim 1, further comprising:
identifying, by the RAID controller while recalculating parity, stripes for which parity has been recalculated and stored.

5. The method of claim 1, wherein recalculating parity includes, for each stripe, taking the exclusive-OR of the data stored on the logical data storage device and each of the plurality of data storage devices except for the data storage device storing the parity.

6. The method of claim 1, wherein recalculating parity includes, for each stripe, taking the exclusive-OR of the data stored on the logical data storage device, the data storage device storing the current parity and the single data storage device storing the operating system image.

7. The method of claim 1, further comprising:
operatively coupling a second data storage device to the RAID controller in place of the single data storage device, the second data storage device storing an updated operating system image.

8. The method of claim 7, further comprising:
recalculating, after operatively coupling the second data storage device to the RAID controller, parity on each of the plurality of data storage devices using data stored on the second data storage device and the plurality of data storage devices except for the data storage device storing the parity.

9. A computer program product for controlling data storage, the computer program product comprising a computer readable storage medium that is not a transitory signal having program instructions embodied therewith, the program instructions executable by a processor to:
store data in a hybrid asymmetric mix of a RAID 1 mirror and a parity-based RAID array, wherein a first side of the RAID 1 mirror includes a single data storage device storing an operating system image and a second side of the RAID 1 minor includes a plurality of data storage devices forming a parity-based RAID array;
calculate parity using data from both the single data storage device and the plurality of data storage devices; and
store the calculated parity only on the plurality of data storage devices;
recalculate, in response to a user command, parity on each of the plurality of data storage devices using a predetermined data pattern for a logical data storage device logically replacing the single data storage device storing the operating system image, wherein the same stripe count is maintained before and after the logical data storage device logically replaces the single data storage device storing the operating system image; and
store the recalculated parity on the plurality of data storage devices; wherein, after the recalculated parity are stored on each of the plurality of data storage devices, physically disconnecting the single data storage device from the processor does not result in the parity-based RAID array having a loss of redundancy.

10. The computer program product of claim 9, wherein the predetermined data pattern is selected from all logical ones and all logical zeros.

11. The computer program product of claim 9, wherein the parity is distributed across the plurality of data storage devices that form the parity-based RAID array.

12. The computer program product of claim 9, wherein the program instructions are further executable by the processor to:
identify, while recalculating parity, stripes for which parity has been recalculated and stored.

13. The computer program product of claim 9, wherein recalculating parity includes, for each stripe, taking the exclusive-OR of the data stored on the logical data storage device and each of the plurality of data storage devices except for the data storage device storing the parity.

14. The computer program product of claim 9, wherein recalculating parity includes, for each stripe, taking the exclusive-OR of the data stored on the logical data storage device, the data storage device storing the current parity and the single data storage device storing the operating system image.

15. The computer program product of claim 9, further comprising:
recalculating, in response to detecting that a second data storage device has replaced the single data storage device, parity on each of the plurality of data storage devices using data stored on the second data storage device and the plurality of data storage devices except for the data storage device storing the parity.

16. An apparatus, comprising:
at least one storage device for storing program instructions; and
at least one processor for processing the program instructions to:
store data in a hybrid asymmetric mix of a RAID 1 mirror and a parity-based RAID array, wherein a first side of the RAID 1 mirror includes a single data storage device storing an operating system image and a second side of the RAID 1 minor includes a plurality of data storage devices forming a parity-based RAID array;
calculate parity using data from both the single data storage device and the plurality of data storage devices; and
store the calculated parity only on the plurality of data storage devices;
recalculate, in response to a user command, parity on each of the plurality of data storage devices using a predetermined data pattern for a logical data storage device logically replacing the single data storage device storing the operating system image, wherein the same stripe count is maintained before and after the logical data storage device logically replaces the single data storage device storing the operating system image, and
store the recalculated parity on the plurality of data storage devices, wherein, after the recalculated parity are stored on each of the plurality of data storage devices, physically disconnecting the single data storage device from the processor does not result in the parity-based RAID array having a loss of redundancy.

17. The apparatus of claim 16, the at least one processor for further processing the program instructions to:
identify, while recalculating parity, stripes for which parity has been recalculated and stored.

18. The apparatus of claim 16, wherein the predetermined data pattern is selected from all logical ones and all logical zeros.

19. The apparatus of claim 16, wherein the parity is distributed across the plurality of data storage devices that form the parity-based RAID array.

* * * * *